United States Patent [19]

van der Merwe

[11] 4,163,340

[45] Aug. 7, 1979

[54] INSECT CAPTURING AND EXTERMINATING DEVICE

[76] Inventor: Schalk W. van der Merwe, P.O. Box 454, Pretoria, South Africa, 0001

[21] Appl. No.: 756,703

[22] Filed: Jan. 4, 1977

[51] Int. Cl.$^2$ .............................................. A01M 3/00
[52] U.S. Cl. ...................................................... 43/134
[58] Field of Search ........................................ 43/134

[56] References Cited

U.S. PATENT DOCUMENTS

| | | | |
|---|---|---|---|
| 187,016 | 2/1877 | Johnston | 43/125 |
| 714,992 | 12/1902 | Arnold | 43/134 X |
| 1,055,240 | 3/1913 | Sutton | 43/134 |
| 1,212,225 | 1/1917 | Hunt | 43/134 |
| 1,626,530 | 4/1927 | Harris | 43/134 |
| 1,638,690 | 8/1927 | Hake | 43/134 |
| 1,750,163 | 3/1930 | Disney | 43/134 |

FOREIGN PATENT DOCUMENTS

| | | | |
|---|---|---|---|
| 235405 | 6/1911 | Fed. Rep. of Germany | 43/134 |
| 26338 | of 1909 | United Kingdom | 43/134 |

*Primary Examiner*—Louis G. Mancene
*Assistant Examiner*—Daniel J. Leach
*Attorney, Agent, or Firm*—Cushman, Darby & Cushman

[57] ABSTRACT

An insect capturing and exterminating device comprises a capturing unit actuated to open and close by a hand-operated actuating mechanism, the capturing unit containing an insect exterminating agent therein and having at least one isolation exit leading to a transparent isolation unit which seals off the or each isolation exit.

12 Claims, 3 Drawing Figures

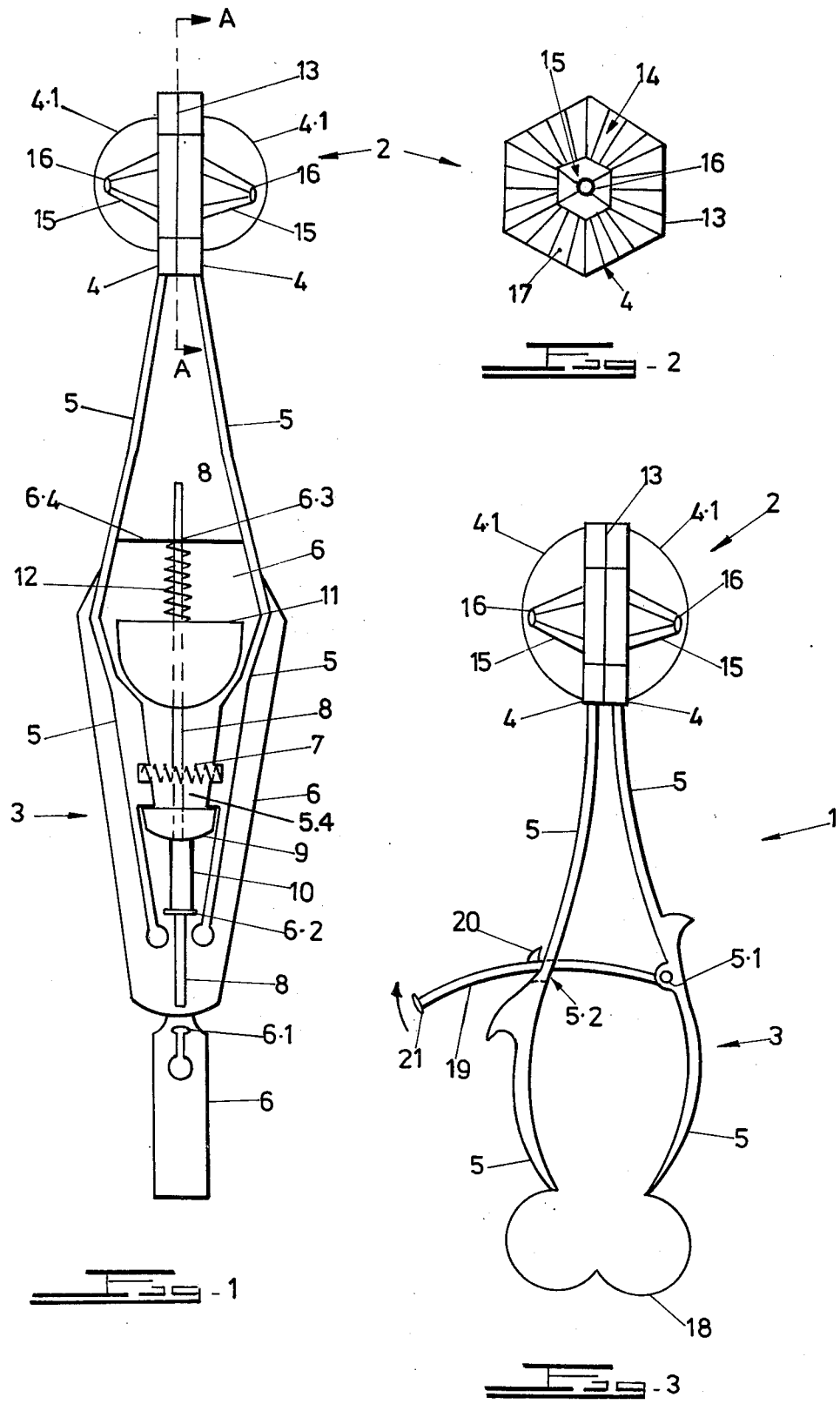

INSECT CAPTURING AND EXTERMINATING DEVICE

BACKGROUND OF THE INVENTION

This invention relates to an insect capturing and exterminating device. More particularly this invention relates to a hand operated device for readily capturing and exterminating insects of the Diptera species, such as the housefly. The device enables a selected insect to be approached, actuating the device when sufficiently close to the insect, and capturing the insect within a capturing unit. The interior of the capturing unit is provided with an insect exterminating agent such as a contact poison, which is applied to the insect. The capturing unit is provided with at least one isolation exit through which the insect is allowed to escape into a transparent isolation unit. The insect is then exterminated in the isolation unit and may be eliminated therefrom whenever convenient by removing a portion of the isolation unit to give access to the interior thereof.

It is well known that most household devices and means for exterminating houseflies, for example, are unhygienic and/or promote pollution of the atmosphere, and are, therefore, generally unsuitable for use for example in a kitchen or wherever food is prepared or served.

Present methods and devices, especially for exterminating houseflies, act indiscriminately in killing harmless, and even useful, insects, pollute the atmosphere, create unhygienic, unsightly and repulsive conditions, or are only partly effective since there are mainly dependent upon a change meeting between the agent and the insect.

The above-mentioned defects and disabilities inherent in such devices in general use can be largely eliminated if the flight reflexes of the insect could be neutralized or anticipated so that it may be purposefully approached, captured, and then exterminated.

Experimental studies by the applicant have, however, shown that flight reflexes of the housefly tend to be activated only by certain environmental conditions. Such conditions include the following: perception of visual images within the environment which move rapidy towards the insect, images of rapid, jerky movements including changes of direction; sudden air turbulence or air pressure caused by movement of objects; images presented by an upward movement of the arm and hand even when such movement is comparatively slow.

Of the images described above, that of the human hand and arm rising in a vertical plane appears to elicit the most prompt and unfailing response.

In the light of the above considerations, an apparatus and method are required whereby an insect is approached with a suitably designed device in hand for its capture, handled as herein described, namely by approaching the insect without initially raising the hand or arm above the level at which the insect itself is situated and to continue in the same plane as the insect with a steady, even and unbroken movement. Conveniently, such a plane in practice constitutes a horizontal plane. In addition, the device, which is more fully described below, should be so designed that its foremost extremities do not arouse the insect but bypass the insect as far as required thus further mitigating against arousal of the flight of the insect.

In order to capture an insect effectively with any capturing device, the following conditions are required:
 (a) Close proximity of the device to the insect;
 (b) Use of a device, the action of which will reduce air turbulence in one direction, which provides a stimulus to flight as well as an airborne passage away from the entrapping device, and
 (c) Use of a device capable of swift action.

SUMMARY OF THE INVENTION

The present invention has as its main object a device and method for the discriminate, hygienic, and pollution-free capturing and exterminating of certain species of insects, notably such as *musca domestica*. In providing the device, the above-mentioned disadvantages of existing devices are largely overcome, whilst the above-listed conditions are met.

A further object of this invention is to provide a device for facilitating the capturing of insects without intending to exterminate such insects.

According to the present invention, an insect capturing and exterminating device comprises a capturing unit actuatable by an actuating mechanism, the capturing unit containing an insect exterminating agent and having at least one isolation exit leading to an isolation unit.

The capturing unit preferably comprises a pair of jaw members openable and closable when actuated by the actuating mechanism, each jaw member in turn comprising a peripheral portion and a central recessed portion with an isolation opening in the central recessed portion.

The interior of the capturing unit is at least partly lined with a fibrous material to which is applied the insect exterminating agent.

The inside surface of the capturing unit is provided with a plurality of suitable radially disposed channels.

The isolation unit comprises a transparent surround removably fastened along its edge to the capturing unit over the or each isolation exit.

Also according to the invention, a method of capturing and exterminating insects with the aid of a device as hereinbefore described, the method including the steps of closely approaching an insect with the device in an open configuration in substantially the same horizontal plane as the insect, actuating the capturing unit of the device to close about the insect, applying to the captured insect an insect exterminating agent, and permitting the insect to emerge from the capturing unit to the isolation unit through an isolation exit.

It is to be understood that the description of the examples of the present invention given hereinafter are not by way of limitation and various modifications within the scope of the present invention are possible without departing from the scope thereof.

Referring to the drawings:

FIG. 1 is a plan elevation of a first embodiment of an insect capturing and exterminating device according to the present invention showing one type of actuating mechanism;

FIG. 2 is a side view of the capturing unit of FIG. 1 taken along line AA; and

FIG. 3 is a plan elevation of a second embodiment of the invention showing a simplified actuating mechanism.

Referring firstly to FIG. 1, there is illustrated an insect capturing and exterminating device 1 comprising a capturing unit 2 and an actuating mechanism 3.

The capturing unit 2 consists of two jaw members 4,4 which will be described in greater detail hereunder. (See FIG. 2).

Each jaw member has a transparent plastic dome member 4.1 fitted to its exterior. Each dome member 4.1 snaps over a portion of the jaw member 4 (not shown) to provide a removable, air tight covering.

The actuating mechanism 3 consists of two elongate members 5,5 each of which is connected to a respective jaw member 4,4 at their one end whilst at their ends remote from the jaw members, they are pivotally connected to a base plate 6. A helical steel spring 7 connected to the inside of each elongate member 5,5 serves to bias the elongate members together.

A retracting pin 8, passing through the base plate 6 at 6.1 having an opening disc 9 slidable along it, passes through an opening in the pivoted end of the mechanism 3. The pin has a bulbous formation at its free end. A trigger (not shown) is fast with the disc 9 and is slidable along a slot (also not shown) in the base plate 6. A helical steel spring 10 through which the pin 8 passes rests against an upturned portion 6.2 of the base plate 6 and serves to push the disc 9 in the direction of the spring 7.

The pin 8 is fast with a solid semi-circular member 11, and extends beyond this member and through a slot 6.3 in an upturned flange 6.4 of the base-plate 6.

A helical steel spring 12 serves to bias the member 11 away from the flange 6.3.

A handle or pistol grip (also not shown) is conveniently provided underneath and fast with the base plate 6 at its free end.

Referring to FIG. 2, the illustration shows the inside of one jaw member 4, having an outer rim 13, a peripheral portion 14, and a central recessed portion 15 with an opening 16 at the apex thereof.

A ribbed fibrous lining 17 is secured to the surface of the peripheral portion 14, the ribs and adjacent channels being arranged in radial fashion.

The lining 17 has an exterminating agent, for example a contact poison, applied thereto, suitable for exterminating houseflies for example. The exterminating agent may also be a suitable oil, for example a light machine oil, which is sufficiently fluid to spread over the entire body and limbs of an insect when the insect has been contacted in the capturing unit. The lining 17 is disposable and may be replaced by a replacement lining when the used lining is no longer suitable.

In another embodiment, the lining 17 may have a contact poison applied thereto, whilst the central recessed portion 15 has a ring of fibrous material (not shown) around the opening 16, the ring of fibrous material being impregnated with a suitable oil. In this way, any insect caught in the capturing unit 2 is first contacted with a contact poison and then with oil.

The opening 16 is of a size to permit an insect such as a housefly for example to crawl outwardly through the opening 16.

The outer configuration of the capturing unit is hexagonal to present several edge surfaces, one of which may be suitably placed adjacent a surface on which an insect to be captured is present.

In use, the pin 8 is retracted and this retracts the member 11 which in turn pushes the members 5,5 apart thereby opening the jaws 4,4.

When the members, 5,5 are sufficiently far apart, the disc 9 under the influence of the spring 10 moves in the direction of the spring 7 to keep the members apart by remaining in the narrow part 5.4 between the members 5,5.

The pin 8 may then be released. Under the influence of the spring 12, the member 11 together with the pin 8 moves back to its inoperative position, whilst leaving the jaws 4,4 open, through the action of the disc 9.

An insect such as a housefly may now be carefully approached in a substantially horizontal plane, whilst placing one of the surfaces of the capturing unit adjacent the surface on which the housefly is present.

When the jaws are positioned to either side of the housefly, the trigger is pulled. This moves the disc 9 back to its operative position, thereby allowing the jaws 4,4 to snap shut by the members 5,5 moving together under the influence of spring 7.

The housefly is then captured in the capturing unit 2, usually in the peripheral portion 14 thereof. In this position the fibrous lining of each jaw member 4 contacts the housefly between the two linings 17,17 with the exterminating agent. However, the housefly has sufficient freedom of movement to crawl along one of the radial channels between the radial ribs in the linings 17,17 towards the central portion 15.

These channels serve as exit guides thereby preventing the insect from meandering inside the capturing unit, and thus promoting rapid clearance of the unit for re-use of the device.

When the housefly reaches the central portion 15, it escapes through the exit 16. However, when it passes through the exit 16 it finds itself within the isolation compartment 4.1 where it dies.

When convenient, any dead houseflies caught in this way may be removed from the device and disposed of by unclipping the transparent plastic dome 4.1 from the jaw member 4. When the dome 4.1 has been refitted, the device is ready for operation.

Referring to FIG. 3, like numerals indicate like components, unless otherwise indicated.

At the end of the mechanism 3 remote the capturing compartment 2, a spring member 18 biases the elongate members 5,5 apart. A locking lever 19 pivoted at 5.1 on the one elongate member 5, passes through a slot 5.2 in the other elongate member 5. A protrusion 20 on the locking lever 19 allows the elongate members 5,5 to be locked in a position so that the jaw members 4,4 are positioned adjacent each other in touching relationship, i.e., so that they are closed.

A stop member 21 is conveniently provided at the free end of the locking lever 19.

A housefly, for instance, is approached in the same manner as with the device of FIG. 1. However, in order to capture the housefly, it is necessary to bring the members 5,5 together smartly by hand, and then to lock the members 5,5 together in the inoperative position by moving the locking lever 19 and releasing the grip on the members 5,5.

Operation of the capturing and isolation units is identical to that of FIG. 1.

While the foregoing specification has disclosed certain presently preferred embodiments and modifications of the invention, it will be appreciated that such disclosure is not to be deemed to limit the invention to the precise details of construction thus disclosed. Therefore, it will be understood that the invention includes, as well all of such changes and modifications in the parts and in the construction, combination and arrangements of parts as shall come within the purview of the appended claims.

I claim:

1. An insect capturing and exterminating device comprising
   a capturing unit comprising a pair of jaw members relatively movable with respect to each other, each jaw member comprising a peripheral mating portion and a central recessed portion,
   an actuating mechanism for actuating said jaw members to effect movement thereof with respect to each other,
   an insect exterminating agent in said capturing unit,
   an isolation unit, and
   an opening in at least one of said jaw members central recessed portion leading from said capturing unit to said isolation unit.

2. An insect capturing and exterminating device comprising
   a capturing unit, said unit having an interior surface thereof with a plurality of radially disposed channels,
   an actuating mechanism for actuating said capturing unit,
   an insect exterminating agent in said capturing unit,
   an isolation unit, and
   at least one isolation exit leading from said capturing unit to said isolation unit.

3. An insect capturing and exterminating device comprising
   a capturing unit,
   an actuating mechanism for actuating said capturing unit,
   an insect exterminating agent in said capturing unit,
   an isolation unit comprising a transparent surround removably fastened along an edge thereof to said capturing unit, and
   at least one isolation exit leading from said capturing unit to said surround.

4. A flying insect capturing device comprising
   a capturing unit comprising a pair of jaw members relatively movable with respect to each other, each jaw member having a hexagonal peripheral portion mating with the peripheral portion of the other jaw member, to provide a capturing unit having a hexagonal configuration,
   an actuating mechanism for actuating said jaw members to effect movement thereof with respect to each other,
   an isolation unit, and
   at least one isolation exit leading from said isolation unit to said capturing unit.

5. A flying capturing device comprising
   a capturing unit for closing around an insect to capture the insect, and
   means for snap actuating said capturing unit so that an insect can be approached surreptitiously along a generally horizontal plane for closing said capturing unit around said insect by essentially pure horizontal closing of said capturing unit around the insect, so that insects on a wide variety of surfaces having a wide variety of surface configurations may be captured.

6. A device as recited in claim 5 wherein said capturing unit comprises a pair of jaw members relatively movable with respect to each other.

7. A device as recited in claim 6 wherein each of said jaw members comprises a peripheral mating portion and a recessed central portion.

8. A device as recited in claim 7 wherein said jaw members having polygonal peripheral mating portions so that a capturing unit having a polygonal configuration is provided.

9. A device as recited in claim 5 further comprising an insect exterminating agent in said capturing unit, an isolation unit, and at least one isolation exit leading from said isolation unit to said capturing unit.

10. A method of capturing flying insects on a wide variety of surfaces having a wide variety of surface configurations, utilizing an inantimate capturing apparatus, comprising the steps of
    surreptitiously approaching an insect disposed on a surface along a generally horizontal plane, and
    closing the capturing apparatus around the insect by essentially pure horizontal closing of the capturing apparatus around the insect.

11. A method as recited in claim 10 comprising the further steps of immediately exterminating the insect once captured in the capturing apparatus by providing an exterminating agent in the capturing apparatus.

12. A method as recited in claim 11 wherein the apparatus includes an isolation unit in operative communication with the capturing apparatus, and comprising the further step of quickly removing the captured exterminated insect from the capturing apparatus to the isolation unit.

* * * * *